(No Model.)
6 Sheets—Sheet 4.

C. W. WEISS.
CASH REGISTER, RECORDER, AND CHECK PRINTER.

No. 512,640. Patented Jan. 9, 1894.

Attest:
A. N. Jesbera
A. Kidder

Inventor:
Carl W. Weiss
by William B. Greely
Atty.

(No Model.)

C. W. WEISS.
CASH REGISTER, RECORDER, AND CHECK PRINTER.

No. 512,640.

Patented Jan. 9, 1894.

Fig. 9.

Attest:
A. N. Jesbera.
A. Kidder.

Inventor:
Carl W. Weiss
by William B. Greeley
Att'y.

UNITED STATES PATENT OFFICE.

CARL W. WEISS, OF BROOKLYN, NEW YORK, ASSIGNOR, BY MESNE ASSIGNMENTS, TO THE NATIONAL CASH REGISTER COMPANY, OF OHIO.

CASH REGISTER, RECORDER, AND CHECK-PRINTER.

SPECIFICATION forming part of Letters Patent No. 512,640, dated January 9, 1894.

Application filed December 30, 1891. Renewed May 17, 1893. Serial No. 474,562. (No model.)

*To all whom it may concern:*

Be it known that I, CARL W. WEISS, of Brooklyn, in the county of Kings and State of New York, have invented certain new and useful Improvements in Cash-Registers; and I do hereby declare that the following is a full and exact description thereof, reference being had to the accompanying drawings, and to the letters and figures of reference marked thereon, making a part of this specification.

This application is a renewal or continuation of application, Serial No. 416,551, filed by me December 30, 1891.

The invention relates to that class of machines in which are employed an actuating device or driving member which is given a uniform movement at each operation of the machine; a driven member, such as an indicator, a register, or a type wheel; means, as a latch or clutch device, intermediate the driving and driven members for intermittently connecting and disconnecting them, to cause the driving member to impart different portions of its uniform movements to the driven member; and a series of keys, stops or trips representing different amounts and co-operating with the latch or connecting means between the driving and driven members to determine the extent of movement imparted by the former to the latter.

Various forms of machines embodying the above elements and having the same general mode of operation are well known. In all of them with which I am familiar the driving member has been given its movement at each operation of the machine either by a crank, lever or other suitable handled device directly actuating the driving member, or by means controlled by a like independent handle or key, and the mode of operation consisted in pressing in or setting the proper keys and then giving the driving member its definite movement by a separate operation of the handled device.

One feature of my invention consists in a new mode of operation of machines of this class, under which the simple operation or setting of the proper key or keys will cause the driving member to be given its definite movement by a suitable motor controlled by the keys, to impart the proper portion of its movement to the driven member; and to this end the novelty of this feature of my invention consists in the combination of the usual or any suitable driving member or actuating device having a definite movement at each operation of the machine, a driven member, as a register, indicator or type wheel, suitable means, as a latch or clutch device, for intermittently connecting the driving and driven members, a motor, such as a spring, for moving the driving member, means, such as a detent, for holding the motor in check, and a series of keys, stops or trips co-operating with the detent to release the motor and also co-operating with the latch or connecting device to determine the extent of movement to be imparted by the driving to the driven member; as will be hereinafter more fully explained.

Other features of my invention relate to a printing wheel which is rotated or oscillated to present the desired character at the printing point, is shifted laterally to bring the desired character into the proper relative positions to represent different denominations, and is caused to print the several figures of a given number in succession; to an adding mechanism in which each wheel, besides being advanced one step by every complete revolution of the next preceding wheel of lower denomination, is also adapted to be advanced any desired number of steps by a single gear which is automatically shifted to operate in succession the several wheels of the series; and to various constructions, combinations and arrangements of parts hereinafter described.

In the drawings.

9 is a vertical sectional view on a line at the right of gear 35 of Fig. 1, looking toward the right, to show the relative arrangement of certain parts of the mechanism.

The motor employed may be an ordinary clock-spring 10 secured to a shaft 11, to which are fixed a usual ratchet-wheel 12 and a crank 13, a stop-pin 14 being fixed in the path of the latter to limit its motion. See Figs. 1, 2 and 10. A gear 15, loose upon the shaft 11, carries a pawl 15*, which is adapted to engage the ratchet-wheel 12 to propel the mechanism and to slip idly over the ratchet-wheel during the movement of the crank 13 to wind up the spring. A pinion 16, supported upon a stud 17, is engaged and driven by the gear 15, and the relation between the two is such, in the machine shown, that the pinion makes five complete rotations during a complete movement of the gear 15 and crank 13. The pinion 16 is formed with or fixed to a disk 18 which is notched, as at 19, or is otherwise formed to be engaged and held against the stress of the spring 10 by a detent 20. The latter is pivoted at 21 and bears a projecting pin 22 which is engaged by an arm 23 extending from a spring-pressed locking-plate 24, Figs. 5 and 9. Spring-seated keys 25, Figs. 1, 4, 5, 9 and 10, representing the several values from 0 to 9, are formed to engage with said plate in such manner that the inward movement of any one key shifts the plate to release the key last pressed in, while the key newly pressed in is retained by the plate until it is released in its turn. The construction and operation of the keys and the locking-plate are as substantially described in Letters Patent of the United States, No. 443,024, granted to me December 16, 1890, and are fully illustrated in Figs. 4 and 5. The inner end of each key-stem,—see Fig. 4,—is formed with a lateral recess b, embracing the retaining plate b' (Fig. 5) and is also formed in a plane at right angles with that of the recess b, with two notches e and f, the one e to engage with the locking-plate 24 when the key is in its outer position, and the other when the key is pushed in. The portion of the stem between the two notches is not only formed as a wedge g to move the locking-plate 24 when the key is pushed in, but is formed with a second bevel h, inclined toward the outer end of the key, to prevent the possibility of the key being caught and held by the edge of the locking-plate 24 and to utilize the spring of the key to aid in throwing the locking-plate to release the detent 20, through the arm 23 and pin 22, from the disk 18 and permit the spring 10 to produce the movements hereinafter referred to. The locking plate 24 may be loosely mounted on a stud (see Fig. 5) which is fixed to the front casing of the register, and is notched peripherally, as at m, m, for co-operation with the key-stems. A spring n, which may be coiled about a fixed pin o projecting through a hole in the plate, presses against a pin p carried by the plate and normally maintains the plate in the position shown in Figs. 5 and 9 so that the inward movement of a key shall move the plate in opposition to the spring.

An eccentric pin 30 on the disk 18, (see Fig. 2,) is connected by a link 31 with a gear segment 32 which is fixed to a shaft 33 supported in bearings 34 in the supporting frame-work and casing of the mechanism. The gear segment meshes with and drives a pinion 35 and the relations between the two and between the connections of the link 31 with the disk and the segment are such that the pinion 35 is given a complete rotation in one direction and then in the other for every rotation of the pinion 16. The pinion 35 also carries with it a disk 36 which is notched as at 37 for the engagement therewith of a dog 38. See Figs. 1, 2, 4 and 9. The pinion 35 and disk 36 are loose upon a shaft 39, which is supported in bearings in a bracket 40 and standard 41, while the dog 38 is fast upon the end of a rock shaft 42 which has a bearing in an arm 43 fixed to the shaft 39. To the other end of the shaft 42 is fixed an arm 44, Fig. 4 bearing a pin 45 which underlies the tail of a trip-latch 46 pivoted upon the shaft 42. The dog 38 is normally pressed into the notch 37 by a spring a and the arm 43 and shaft 39 are consequently compelled to move with the pinion 35, but the trip latch moves in such proximity to the ends of the keys 25 that when a key is pressed in, the outer end of the latch 46 will strike the inner end of that key and through the pin 45 and arm 44, rock the shaft 42 and raise the dog 38 from the notch in the disk 36 and the latter will continue to rotate while the movement of the shaft 39 will be checked. To insure the stopping of the shaft 39 in certain and definite positions the dog 38 is formed with a head 38* to engage, when the dog is raised from the notch in the disk 36, with one of the notches of an interiorly notched or star-toothed ring or plate 47, Fig. 2.

From the foregoing description it will be understood that at the beginning of any given operation of the machine the gear 35 and its disk 36 are coupled to the shaft 39 by the engagement of the dog 38 with the notch in the disk; that when any one of the keys 25 is pressed in the detent 20 will be disengaged from the notch in the disk 18 and thereby release the motor and permit it to give said disk 18 a complete revolution; that this revolution of the disk 18 will oscillate the segmental rack 32 back and forth through its limit of movement and impart a complete revolution to the gear 35 and disk 36, first in one direction and then in the other; that during the revolution of the disk 36 in a forward direction the engagement of the dog 38 with its notch will cause the shaft 39 to be carried with the disk until the latch 46 strikes the end of the key which has been pressed in, whereupon the shaft 42 will be rocked and the dog 38 lifted out of the notch in the disk 36, and the shaft 39 positively arrested by the engagement of the latch 46 with the key, while the disk 36 will complete its forward revolution alone. The shaft 39 will thus be turned with the disk 36 from initial position to a point determined by the operated key, and this shaft may thus be caused to impart to a register, indicator or type wheel a degree of movement proportionate to the value of such operated key. When, during the return backward revolution of the disk 36, the notch in said disk is brought under the nose of the dog 38 the latter will immediately spring into said notch and the shaft 39 will thereby be again coupled to the disk 36 and carried back to initial position. In this manner, at each operation of the machine the shaft 39 is first moved a distance determined by the operated key, and then restored to initial position.

The gear 35, disk 36, latch 46, dog 38, shaft 39, and keys 25, are quite similar, both in arrangement and in their co-operation with each other, to the corresponding parts in my prior patent heretofore referred to, and in machines now in general use, the principal difference being that in such prior patent and machines the operating lever or handle was geared to the driving disk 36, instead of said disk being geared to a motor controlled by the keys. Such being the case the novelty of this feature of my present invention does not reside in the particular construction and arrangement of any of these parts, for in other styles of machines having the same general mode of operation the construction and arrangement of the parts are or may be radically different. It is not essential in many machines that the driving member should have a complete revolution, either in one direction or back and forth in opposite directions; nor is it essential that the driving and driven members should be connected at initial position, as above described, and disconnected at different points by the operated keys, since in some machines of this class the operated keys co-operate with the connecting devices between the driving and driven members in such a way as to connect them at different points, and a separate device causes them to be disconnected at a fixed point, so that in such instances the variable movements imparted by the driving to the driven member are produced by connecting the two at different points and disconnecting them at a fixed point, instead of connecting them at a fixed point and disconnecting them at different points.

In the foregoing description the notched disk 36 may be termed the driving member of the combination, the shaft 39 or the part actuated by it (whether it be an indicator, register or type wheel) the driven member, and the parts intermediate the disk 36 and shaft 39 the clutch device or latch for intermittently connecting the driving and driven members; but, as before stated, the elements corresponding to these three in other styles of machines, embodying the same mode of operation and the novel feature of my present invention, may differ widely in form and arrangement.

So far as I am aware I am the first in the art to combine, in a machine of this general character, a driving member or actuating device of any sort which has a uniform movement at each operation of the machine, a driven member of any sort or for any purpose, means of any kind between the driving and driven members for intermittently connecting them, a motor of any sort for moving the driving member, detaining or locking means of any kind for holding the motor in check, and a series of keys, stops or trips co-operating with the detaining means to release the motor and co-operating also with the connecting means between the driving and driven members to determine the extent of movement to be imparted by the former to the latter, whereby the operation of the entire machine is made automatic and requires only the simple operations of a key, instead of the double operations of setting the key and then independently actuating the driving member as heretofore; and my invention in this respect is restricted only by the terms of my respective claims in which it is set forth.

Figure 3:
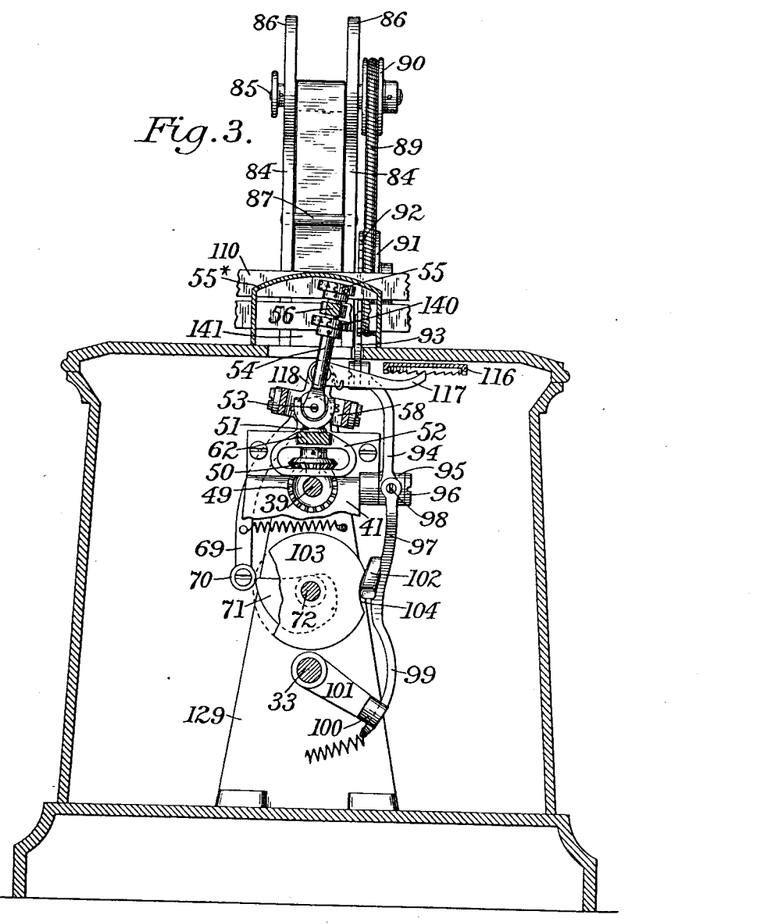
Fig. 3 is a vertical section on the line *z—z* of Fig. 1.
Figure 5:
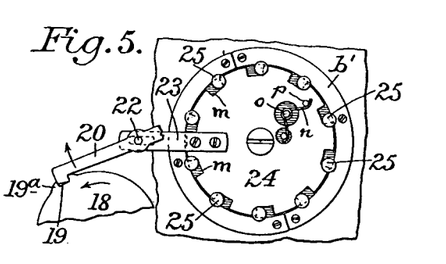
Fig. 5 is a detail view of the locking-plate and parts immediately connected therewith.
Figure 6:
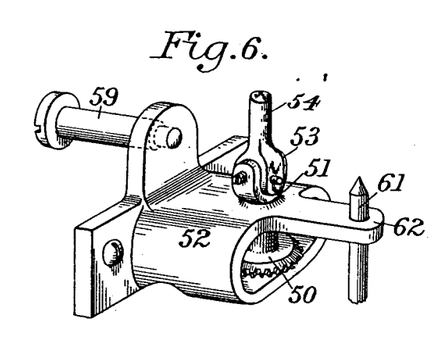
Figs. 6 and 7 are detail views in perspective of parts to be referred to, and Fig. 8 is a detail view in perspective of a portion of the adding mechanism. Fig.
Figure 7:
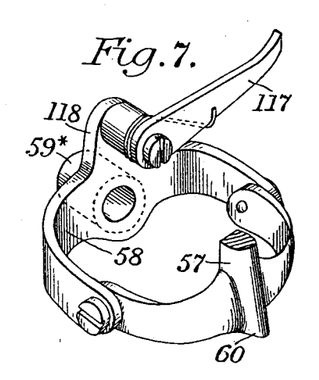

It will be understood that the only purpose of the crank 13 applied to the shaft 11 is to wind up the motor spring, and that this spring may be wound up in any other suitable manner and by any other suitable means. It will also be understood that the motor spring may be of such length that one winding of it will suffice for a considerable number of operations of the machine.

Where the shaft 39 (or the arm 43 carrying the latch and coupling dog, as in my prior patent before referred to and in machines now in general use), is employed to actuate an indicator, the latch 46 will be provided with a trigger or trip which will permit it to clear the end of the operated key during the forward movement of the disk 36 and cause it to be arrested by such key and the dog 38 disengaged from the disk during the return backward movement of the disk, and thereby leave the shaft and indicator in indicating position at the end of the operation of the machine. At the next operation of the machine and forward movement of the disk 36 the dog 38 will enter the notch in the disk as soon as the notch comes under the dog, and the disk will then carry the shaft and indicator forward with it to the end of its forward revolution, and will then carry them backward with it until the latch 46 or its trigger engages the key which has been pressed in, whereupon the dog 38 will be disengaged from the disk 36 and the latter will move on to initial position alone, while the shaft 39 and indicator will remain in the position determined by the key, as will be readily understood. In the machine which I have illustrated in the drawings, however, the shaft 39 is employed to actuate a register and printing wheel. For the former purpose it is connected to the driving gear of the register by a ratchet and pawl or clutch connection which will cause it to carry the driving gear with it in one direction and move independently of it in the opposite direction; but for the latter purpose it is geared directly to the printing wheel, since it is desired that the printing wheel shall at each operation be turned from zero or initial position to print the number representing the value of the operated key, and be returned to initial position at the end of the operation. This printing wheel and its connection with the shaft 39 may now be described as follows: The shaft 39 is geared, through bevel gears 49 and 50 to a short shaft 51, Figs. 1, 3 and 6, which is supported in bearings in a bracket 52, and is connected, by a universal joint 53 with a shaft 54, supported as hereinafter described and bearing the print-wheel 55. The wheel 55 is so supported as to be capable, not only of rotary motion, but of motion to and from the plane of the paper upon which the record is made, or from right to left with reference to Fig. 1, and of motion in a plane at right angles thereto as well. To this end said shaft has a bearing 56 carried by the end of an arm 57 which is forked at its lower end, the extremities of the fork being pivotally connected in the line of the axis of the universal joint 53, to the extremities of a fork 58 (see Figs. 1 and 7) which oscillates on a stud 59 secured to the bracket 52, Fig. 6, which bracket is secured to the supporting standard 41. The arm 57 is formed, in the line of the axis of the shaft 59 with a bearing 60 for the upper end of a spindle 61 which is free to move vertically in a guide 62, carried by the bracket 52, Figs. 6 and 7, and in a guide 63 carried by an arm 64 projecting from the supporting standard 41, Fig. 1. A collar 65 may be fixed to the spindle to limit the downward movement thereof by contact with the guide 63.

Figures 2, 4:
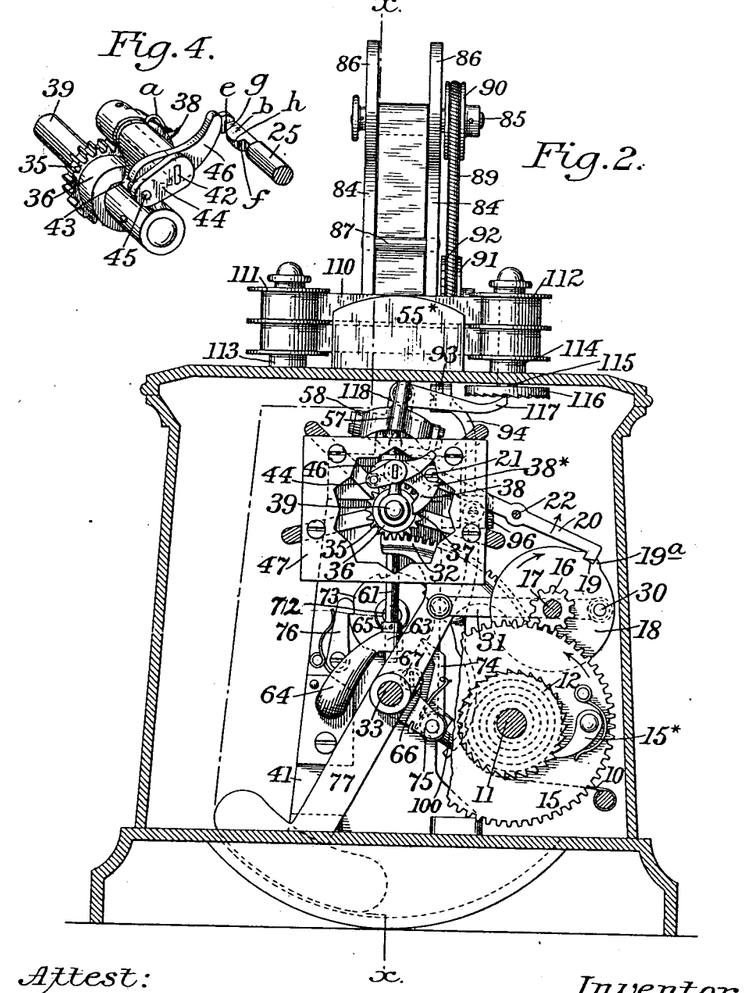
Fig. 2 is a vertical section on the line *y—y* of Fig. 1, the casing and a part of the interior frame being also represented in section on a different plane.
Fig. 4 is a detail perspective view of a portion of the mechanism for setting the print wheel.

The oscillating shaft 33, hereinbefore referred to, has fixed thereto a short arm 66 which may be provided with a small roller 67, Fig. 2. Just at the completion of the first movement of said arm 66 and shaft 33 toward the left in Fig. 2, the arm strikes the lower end of the spindle and raises the same, causing the arm 57 to swing on its pivot and to throw the wheel 55 into contact with the paper. Before this action takes place, however, it is necessary that the wheel 55 should be swung laterally in order to bring the figure thereon which has been set at the line of print, into the proper position to represent the desired denomination.

As before stated, the fork 58 to which the arm 57 is pivoted is itself supported by a stud 59. An arm 69 is secured to the hub 59* of the fork 58, Figs. 1 and 3, and bears a small wheel or roller 70 which is adapted to rest, under the influence of a suitable spring attached to the arm, upon the periphery of a cam 71 which is fixed to a shaft 72 supported in bearings in the standard 41 and in the casing. Said shaft 72 is adapted to be rotated step by step, by means hereinafter described, and the cam 71 has its periphery made up, in the construction shown in the drawings, of five sections. When the mechanism is in the position shown, that is, ready to begin its movement, after the rotation of the crank 13 to wind the motor spring 10, the roller 70 rests upon the highest point of the cam 71. The first movement of the shaft 72 will throw the point of the cam 71 away from the collar 70 and allow the roller to drop upon the lowest point of the cam, Fig. 3, thereby causing the wheel 55 to swing into its extreme left hand position, or into the hundreds column of dollars. The next movement of the mechanism after a second key is depressed will swing the wheel into position to print tens of dollars, and so on for the five successive movements, the last movement causing the wheel 55 to assume its extreme right hand position for printing units or cents.

Figure 1:
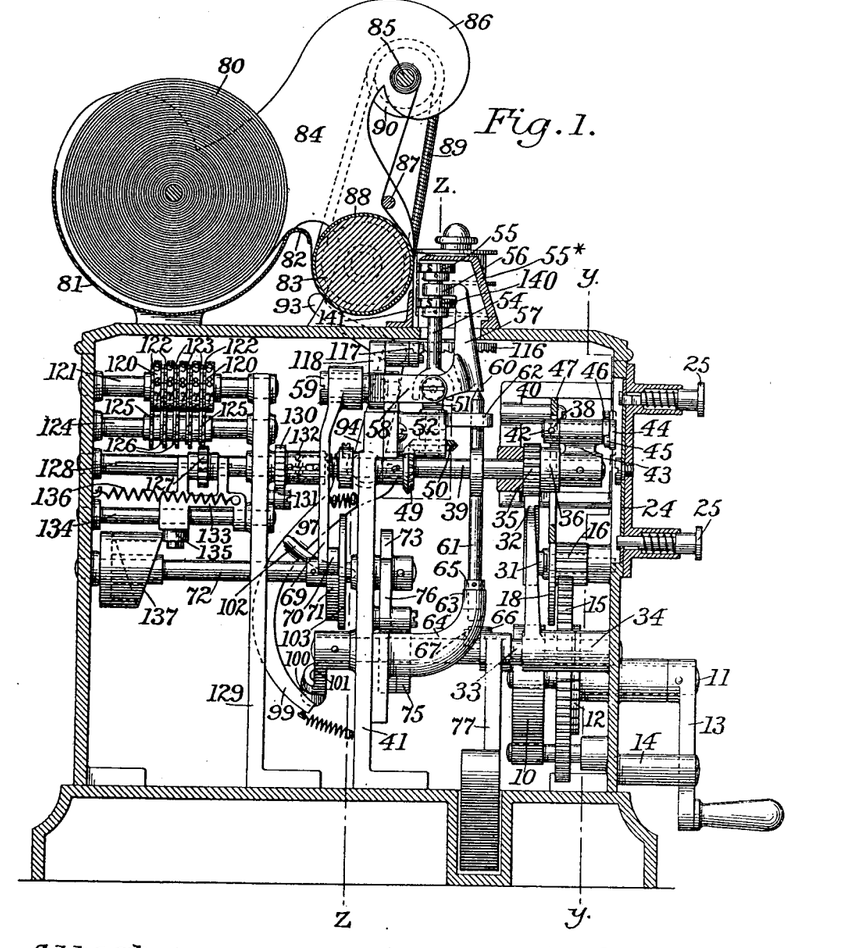
Figure 1 is a vertical section on the line *x—x* of Fig. 2.

In order that the shaft 72 may be turned, with each movement of the mechanism, through one-fifth of a rotation it has affixed to it a notched disk or ratchet-wheel 73, Figs. 1 and 2, having five notches or teeth. These notches are engaged successively by a spring pressed pawl 74 (Fig. 2) which is carried by an arm 75 fixed to the shaft 33, so that at each oscillation of said shaft the disk or ratchet-wheel 73, shaft 72 and cam 71 are advanced one-fifth of a rotation. A suitable holding-pawl 76 is provided to prevent backward movement of the ratchet-wheel 73. For the purpose of steadying the movement of the shaft 33 and of the mechanism actuated thereby a weighted arm 77 may be fixed upon said shaft.

The mechanism above described has for its object to effect the proper movements of the recording or printing wheel 55.

I will now proceed to describe the mechanism for causing the proper movement of the paper upon which the wheel 55 makes its imprints and of the inking-ribbon. The roll 80 of paper may be supported in a suitable casing 81 fixed in a convenient proximity to the print-wheel 55. Thence the paper is led over a bearing 82, to give the proper degree of tension and about a driving roll 83 which is journaled in a frame 84 to a winding roll 85 journaled in the arms 86 of said frame. A guide 87 may be interposed between the driving-roll 83 and the winding-roll 85. The driving-roll 83 is supported in such proximity to the print-wheel 55 that it constitutes an impression-roller or platen for said print-wheel, and for this purpose its surface may be covered with suitable material 88, as rubber. The winding-roll may be driven by means of a band 89 and pulleys 90 and 91. Fixed to the shaft of the pulley 91 or formed therewith is a ratchet-wheel 92 which is adapted to be driven by a pawl 93, carried by an arm 94 which is fixed to a sleeve 95 supported by a stud 96, Fig. 3. A bent lever 97 is forked to embrace said sleeve and is pivoted thereon as at 98 to swing in a plane at right angles to the plane of movement of the arm 94. The lower end 99 of said lever 97 is bent so as to stand when so permitted in the path of movement of a roller 100 carried by an arm 101 which is fixed to the shaft 33, Figs. 1 and 3. The lever 97 also bears a finger 102 which is adapted to rest normally upon the periphery of a disk 103 fixed on the shaft 72 or to drop into a notch 104 formed in the periphery of said disk. The notch in said disk 103 is formed at such a point in the periphery of the disk as that the finger 102 will drop into it just as the mechanism before described for actuating the print wheel completes its fifth movement. In this manner the driving roll 83 is actuated and the paper is advanced just after the last figure of the amount registered has been printed, whether such figures be (0) or a significant figure. By the co-operation of the finger 102 with the disk 103 the lever 97 is held out of the path of the roller 100 during the preceding movements of the mechanism and advancement of the paper is consequently prevented until the proper moment. The inking ribbon 110 may be carried by spools 111 and 112 supported by standards 113 and 114, Fig. 2. The actuating shaft 115 of the spool 112 extends downward through the standard 114 and is provided at its lower end with ratchet-wheel 116. Said ratchet-wheel is adapted to be actuated by a pawl 117 which is carried by an arm 118 of the fork 58, (see Fig. 7,) and is caused by its oscillations to advance the ratchet-wheel and shift the ribbon slightly with every movement of the print wheel. A hood 55* may be fixed to the top of the casing of the register to cover and protect the print-wheel and the portions of the shaft 54 and arm 57 which project above the main casing.

Figure 8:
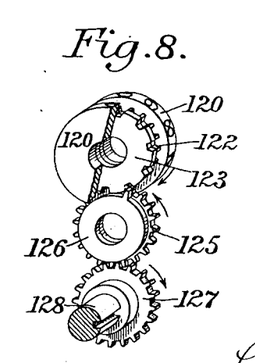
Figure 9:
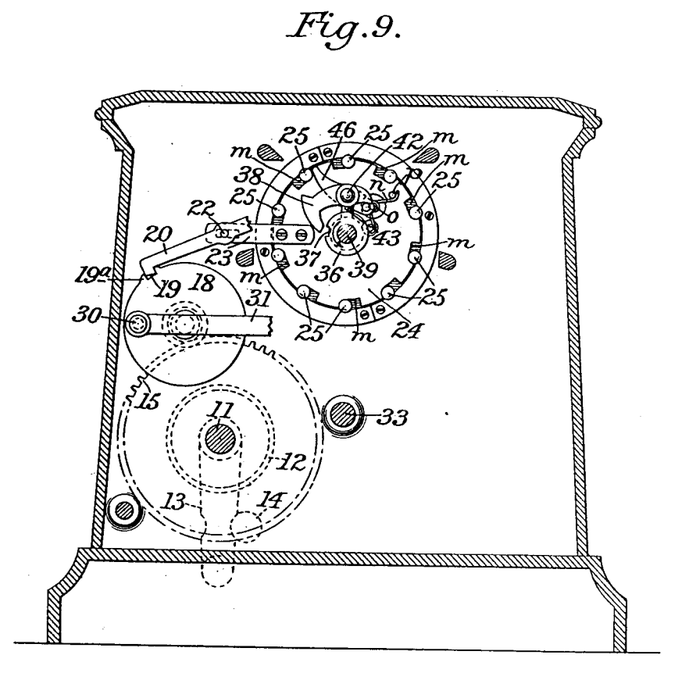
Figure 10:
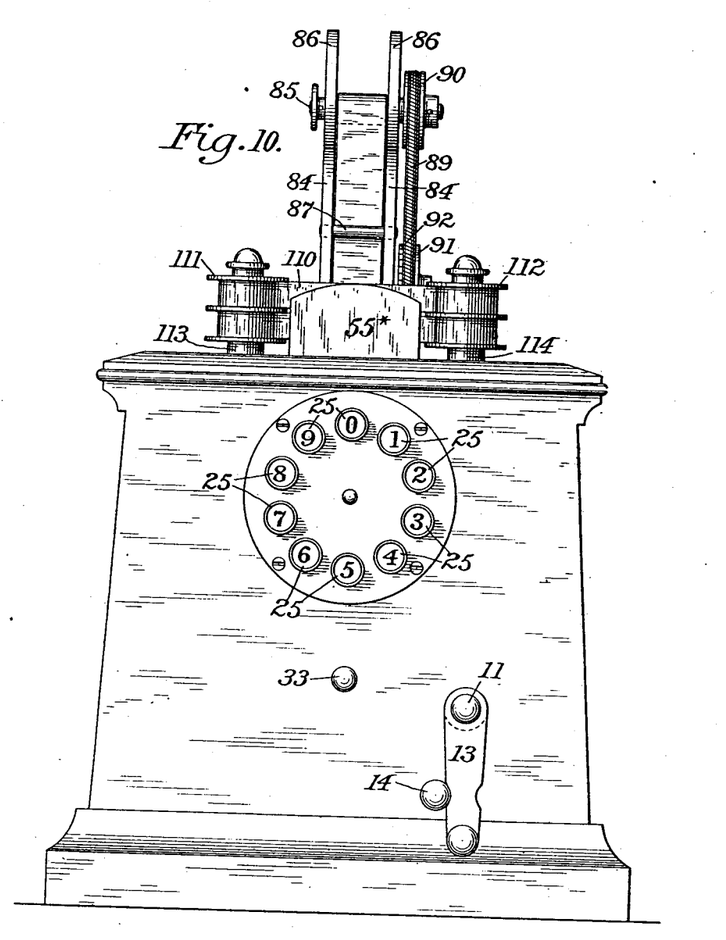
Fig. 10 is a front elevation of the register, looking toward the left in Fig. 1.

The adding mechanism which has now to be described, is in general construction similar to that usually employed, but instead of having the whole train driven through the units wheel alone, is so far modified as to permit each wheel of the higher denominations to be operated independently of the wheel of the next lower denomination while at the same time it may be operated, when necessary, by the wheel of the next lower denomination. The several number wheels 120, 120, Figs. 1 and 8, are mounted to rotate upon a fixed shaft 121, and each has fixed thereto on one side a gear 122 and on the other side a ten-toothed gear 123, except the first wheel of the series which has no gear 123. Upon a second fixed shaft 124 is mounted to rotate a series of gears 125, 125, meshing respectively with and equal to the gears 122, and having fixed thereto the single-toothed gears 126, 126, which are adapted to drive the gears 123. The several gears may be provided with pawls or may have sufficient friction upon the shafts to prevent overrunning. By these means each number-wheel may be advanced by means independent of the wheels of lower denominations while it causes the proper advancement of the wheels of the higher denominations. The gears 125 are adapted to be engaged in succession by a pinion 127, which is equal to the gear 125 and which is splined to its shaft 128 so as to slide longitudinally thereon while being compelled to rotate therewith. Said shaft 128 has suitable bearings in the casing and in a standard 129 and has fixed thereon a ratchet-wheel 130 which may be engaged by a hold-pawl 131 to prevent backward rotation of the shaft. Said shaft 128 is connected by a slipping clutch 132 with the oscillating shaft 39 hereinbefore described, so that the shaft 128 may be driven in one direction by said shaft 39. It will be evident that, as the shaft 39 is oscillated at each movement of its oscillating mechanism, to an extent corresponding to the value represented by the key 25 which has been pressed in, the shaft 128 will be rotated to a corresponding extent, but in one direction only, and that the adding mechanism will thereby be advanced to add the value of the key pressed in to the amount already registered. The pinion 127 is embraced by an arm of a fork 133 which slides upon a rod 134 and carries a small wheel or roller 135 which is pressed by a spring 136 attached to the fork, against the edge of a cam 137 fixed to the shaft 72. As before stated, the shaft 72 is rotated step-by-step, through one-fifth of a rotation at each movement of the actuating mechanism by means of the pawl 74 and ratchet 73, Fig. 2. The edge of the cam 137 may be considered as composed of five sections and the movement of each section under the roller 135 causes the movement of the pinion 127 from one gear 125 to another. In the initial position of the whole mechanism the roller 135 stands upon the highest point of the cam 137 so that in the first movement of the mechanism from the position shown in the drawings the spring 136 pulls the gear 127 into its extreme left-hand position and carries it into engagement with the gear 125 which drives the hundreds numbering wheel. At this time the shaft 128 is stationary as during the first forward movement of the shaft 39 the teeth of the two members of the clutch 132 slip idly over each other. The cam 137 owing to its ratchet and pawl connection 73, 74, with the shaft 33 ceases its movement as soon as the shaft 33 completes the forward movement of its oscillation. Upon the return movement of the shaft 33 the shaft 39 is turned a distance determined by the operated key and through its clutch connection 132 with the shaft 128 turns the latter with it and advances the hundreds numbering wheel the proper distance to register the value of the operated key. On the next movement of the mechanism the cam 137 first moves, shifts the pinion 127 into engagement with the next or tens gear 125 and comes to rest, and thereafter the pinion is rotated to advance the tens numbering wheel. By reason of the fact that each gear 123 may rotate without moving the single-toothed gear of the next lower denomination the addition can commence, as described, with the highest denomination, and as the single-toothed gear will advance the ten-toothed gear of the next higher denomination one step every time it completes a rotation the proper changes in the number wheels will be made whenever the total of the figure upon a given wheel already at the sight opening (not shown) and of the number to be added thereto, equals or exceeds ten.

To illustrate the operation of my improved register let it be supposed that a sale amounting to three hundred and ninety dollars and seventeen cents is to be recorded. The print-wheel 55 stands in the position in which it is always left, that is, in its extreme right-hand position with the 0 opposite the cents column and clear of the paper, Fig. 2, and the crank 13 stands on the side of the stop-pin toward the observer, reference being had to Fig. 1. The crank is then turned until it strikes the other side of the stop-pin, thereby winding up the motor spring 10 as indicated in said figure. The "3" key is then pressed in thereby moving the locking-plate 24, causing its arm 23 to lift the detent 20 from the notch in the disk 18, Figs. 2, 5 and 9, and allowing the disk 18 and pinion 16 to move under the influence of the motor. The plate 24 immediately springs back, as described, so that the detent 20 falls again into the notch as soon as the disk 18 and pinion 16 have completed one rotation. During this rotation the segment 32 through the link 31, Fig. 2, is oscillated to and fro, causing a complete rotation of the gear 35 and disk 36 first in one direction and then in the other. The shaft 39 is carried with the disk 36 during the forward rotation until the trip-latch 46 strikes the inner end of the "3" key and lifts the dog 38 from the notch in the disk 36 and locks it in the star plate 47, Figs. 2 and 4. Through the described connections from the shaft 39, Fig. 1, the print-wheel 55 is thus rotated to bring the type-character 3 to the printing point and is there stopped. At the same time the oscillation of the shaft 33 to which the segment 32 is secured, through the pawl 74, ratchet-wheel 73, cam 71, arm 69, shaft 59, fork 58 and arm 57, shifts the print-wheel 55 laterally to bring the type-character 3 opposite the hundreds column. Just at the completion of the forward movement of the shaft 33, which is synchronous with the forward movement of the gear 35, the arm 66 strikes and raises the spindle 61 and throws the print-wheel against the paper as it passes over the impression and driving roll 83. On the return movement of the pinion 35 and disk 36 the dog 38 drops into the notch in the disk 36, rotates the shaft 39 backward and restores the print-wheel 55 to its normal position with the 0 in the line of print. The print-wheel, however, is left opposite the hundreds column as the ratchet-wheel 73 is moved only during the forward movement of the shaft 33. During these movements the ink-ribbon 110 is shifted by the means before referred to, and by means of the contact of the finger 102 with the periphery of the disk 103 the lever 97 is held out of the path of the arm 101 and the paper-feeding mechanism is not actuated. The action of the adding mechanism during these movements has already been fully described and need not be referred to further. As before stated, the detent 20 drops into the notch 19 in the disk 18, when the latter has completed a rotation, and consequently stops the whole mechanism after one cycle of operations as described. The "9" is then pressed in and in the manner before set forth the print-wheel 55 is rotated to bring the type-character 9 to the printing point, is shifted laterally that it may stand opposite the tens column on the tape, and is moved against the tape to produce an impression thereon; and the cam 137 is advanced one step to bring the pinion 127 into engagment with the tens gear 125; on the return movement of the segment 32 the print-wheel is rotated backward to bring the 0 to the printing-point and the pinion 127 is rotated to add 9 to the amount already indicated by the hundreds and tens wheels of the adding mechanism. The mechanism being stopped as before by the detent 20, it is released again by pressing the "0" key. In this case the operations are the same as before, save that, as the trip-latch 46 strikes the end of the "0" key as soon as the movement begins and consequently the shaft 39 is not rotated at all, neither the print-wheel 55 nor the gear 127 is rotated at all. Nevertheless the print-wheel is caused to print a 0 and the gear 127 is properly shifted into engagement with the units wheel 125.

The action of the mechanism when the "1" and "7" keys are operated need not be further described except to note that during the final movement of the mechanism the notch 104 in the disk 103 moves under the finger 102 allowing the lower end 99 of the lever 97 to stand in the path of the arm 101 so as to be struck thereby just as the movement is completed thereby advancing the paper after the final imprint has been made. It will be evident, that, in case one figure was to be repeated one or more times, as in 222, 00, the same key must be operated two or more times in succession.

In my said Patent No. 443,024, heretofore referred to, the locking-plate 24 was shifted by each key previously operated, there being no occasion to operate one key two or more times in succession. In the present case, therefore, independent means must be provided to release any key upon the completion of the round of movements established by its operation. To this end, on that side of the notch 19 in the disk 18 which first reaches the end of the detent 20, is formed a cam projection 19ᵃ which, just before the notch itself reaches the end of the detent, moves said detent sufficiently to shift the plate 24, through the pin 22 and arm 23, and release any key held in by it. Should the number to be registered occupy a less number of places than the full number which the machine is capable of registering the "0" key must be operated successively until the place of the first significant figure is reached, so that a record of seventeen cents would appear thus, 00017, upon the paper.

To indicate the amount of each sale for the benefit of the customer or for any other reason, the paper may be so guided from one roll 83 to the other 85 as to expose to view the last record printed thereon. In some cases it may also be desirable to print upon a separate check the amount of each sale. For this purpose a check printing wheel 140 is supported and geared to rotate and move with the print-wheel 55, Fig. 1. I have shown it in the present case as mounted upon the shaft 54 below the wheel 55 and as adapted to make an impression on a check which may be slipped between itself and a platen 141.

For the sake of clearness I have, throughout the foregoing description, made specific mention of the various parts, but it is to be understood that I do not thereby limit myself to the exact details of construction shown and described, as it is obvious that many variations might be made in the construction without departing from the spirit of my invention. Furthermore, it is evident that the print-wheel might be, for each denomination, itself an indicator and that the mechanism for setting the wheel to bring the desired character to a certain point is no less applicable to a wheel or indicator rotating on a fixed axis than to one mounted on a laterally movable axis. It is therefore to be understood, that while the term "print-wheel" is employed in the claims hereinafter, it is so employed for the sake of uniformity and as a convenient identification of the part referred to but not with the intention of restricting the claims in every case to a wheel used solely for producing an impression on paper.

I claim as my invention—

1. The combination of a print wheel bearing a series of type figures or characters, and a platen co-operating therewith, said wheel being mounted to rotate and to swing laterally upon a pivot parallel with the platen, means to rotate said wheel to bring the desired type character to printing position, and to swing it laterally to present said character at different lines of print, and means for causing printing impact between the wheel and platen, substantially as described.

2. The combination of a print wheel bearing a series of type figures or characters, and a platen co-operating therewith, said wheel being mounted to swing upon a pivot in planes both parallel with and at right angles to the platen, and means for rotating the wheel to bring the desired character to printing position and for swinging it upon its pivot parallel with the platen, to bring said character to different lines of print, and for swinging it at right angles to the platen to cause it to strike the latter and effect the printing, substantially as described.

3. The combination of a print-wheel having thereon a series of type-figures or characters, a shaft having a universal joint, and bearing the type-wheel, means to rotate said shaft to bring the desired character on the wheel to the line of print, an arm supporting the member of said shaft which bears the print-wheel, means for shifting said arm laterally to cause the character at the line of print to stand in different lines, and means for causing the printing impact between said wheel and its platen, substantially as shown and described.

4. The combination of a print-wheel having thereon a series of type-figures or characters, a shaft having a universal joint and carrying said wheel, an arm supporting the free member of said shaft and itself supported to swing in a plane parallel with the plane of the paper, means to rotate said shaft and bring the desired character on the print-wheel to the line of print, means to shift said arm to cause the character at the line of print to stand in different lines, and means for causing the printing impact between said wheel and its platen, substantially as shown and described.

5. The combination of a print-wheel having thereon a series of type-figures or characters, a shaft having a universal joint and carrying said wheel, an arm supporting the free member of said shaft, a support for said arm pivoted to oscillate in a plane parallel with the plane of print and to which support said arm is pivoted to swing in a plane at right angles to the plane of print, means to rotate said shaft to bring the desired character on the print-wheel to the line of print, means to shift said arm in a plane parallel with the plane of print, and means to move said arm in a plane at right angles to the plane of print, substantially as shown and described.

6. The combination of a print-wheel, a shaft having a universal joint and carrying said wheel, a transmitting shaft, a gear having a clutch connection with said shaft, a series of keys for effecting the disengagement of said clutch and different points, means for actuating said gear, an arm supporting the free member of said jointed shaft and pivoted to swing in a plane at right angles to the plane of print, a cam-arm and intermediate connections for swinging said supporting arm, and means to actuate said cam-arm in synchronism with the movement of said gear, substantially as shown and described.

7. The combination of a print-wheel, a shaft having a universal joint and carrying said wheel, a transmitting shaft, a gear having a clutch connection with said shaft, a series of keys for effecting the disengagement of said clutch at different points, means for actuating said gear, an arm supporting the free member of said jointed shaft and pivotally supported to swing in a plane parallel with the plane of print, a lever connected therewith, a cam for acting upon said lever, means to advance said cam in synchronism with the movements of said gear, and means for causing the printing impact between said wheel and its platen, substantially as shown and described.

8. The combination of a print-wheel, a shaft for driving said wheel, a gear having a clutch connection with said shaft, a motor for said gear, a detent for said motor, a series of keys, means intermediate said keys and detent for releasing the latter by the operation of any one or another of the former, and means intermediate said keys and clutch for effecting the disengagement of the latter at different points, substantially as shown and described.

9. The combination of a print-wheel supported to move in a plane parallel with the plan of print, a cam and connections between said cam and wheel for shifting said wheel, a motor and intermediate gearing for advancing said cam, a detent for said motor, a single series of keys, and means intermediate said keys and detent for releasing the latter by the operation of any one or another of the former to permit the cam to move the wheel step by step to different lines of print, substantially as shown and described.

10. The combination of a print-wheel supported to move both parallel and at right angles to the plane of print, a cam-arm for shifting said wheel, a motor and intermediate gearing for actuating said cam-arm, a detent for said motor, a series of keys, and means intermediate said keys and detent for releasing the latter by the operation of any one or another of the former, substantially as shown and described.

11. The combination of a print-wheel, a motor and an intermediate train of gearing for actuating said wheel, a notched disk carried by one of the train of gears and having a cam projection in advance of the notch, a detent lever adapted to engage with said notch and to be shifted by said cam projection, a series of keys, a locking-plate adapted to engage with and to be shifted by said keys, and a connection between said locking-plate and said detent lever, substantially as shown and described.

12. The combination of a motor, a disk driven thereby, a gear segment, a link connection between said disk and segment, a pinion, a print-wheel supported to rotate and to move in a plane at right angles with the plane of print, means intermediate said pinion and wheel for transmitting the rotary movement of the former to the latter and including a clutch, means for disengaging said clutch, a cam on the shaft of said gear segment, and means intermediate said cam and said wheel to move the latter toward the plane of print, substantially as shown and described.

13. The combination of a motor, a disk driven thereby, a gear segment, a link connection between said disk and segment, a pinion, a print-wheel supported to rotate and to move in a plane parallel with the plane of print, means intermediate said pinion and wheel for transmitting the rotary movement of the former to the latter, and including a clutch, means for disengaging said clutch, a cam and means intermediate said segment and said cam for advancing the latter, and a lever actuated by said cam and adapted to shift said wheel, substantially as shown and described.

14. The combination of a print-wheel, a motor to rotate said wheel to bring the desired character to the line of print, a detent holding the motor in check, a series of keys for releasing the motor and determining the extent of movement imparted to the print wheel, means to support a record tape or paper to receive the imprint of said wheel, a check-printing wheel connected to rotate with said print-wheel, and a platen adapted to support a check in position to receive the imprint of said check-printing wheel, substantially as shown and described.

15. The combination of a paper-feeding roll, a ratchet-wheel for driving said roll, an actuating pawl, a lever carrying said pawl, a cam for operating said lever, and means for holding said lever out of the path of said cam, substantially as shown and described.

16. The combination of a paper-feeding roll, a ratchet-wheel for driving said roll, an actuating pawl, a lever pivoted to said arm to swing in a plane at right angles to the plane of movement of said arm, a cam to act upon said lever, and means to hold said lever out of the path of said cam, substantially as shown and described.

17. The combination of a paper-feeding roll, a ratchet-wheel for driving said roll, an actuating pawl, a pivoted arm carrying said pawl, a lever pivoted to said arm to swing in a plane at right angles to the plane of movement of said arm, and bearing a projecting finger, a cam to act upon said lever, and a rotating notched disk upon the periphery of which the finger of said cam lever is adapted to rest normally, substantially as shown and described.

18. The combination with a spring-pressed locking-plate, of a series of spring-pressed keys, each of said keys being movable in the line of its axis and formed with two notches to be engaged by said locking-plate in the inner and outer positions of the key respectively and the portion of the key between the notches being beveled in both directions, substantially as shown and described.

19. The combination, in a register, of a series of adding wheels, an actuating gear movable parallel with the adding wheels to actuate said wheels in succession, a motor and intermediate means for rotating said gear and successively engaging it with the different adding wheels, means for holding the motor in check, and a series of keys for releasing the motor and controlling its movement of the actuating gear, substantially as described.

20. The combination of a driving member or actuating device having a uniform movement at each operation of the machine, a driven member, means for intermittently connecting the driving and driven members, a motor for moving the driving member, means for holding the motor in check, and a series of keys co-operating with the means for holding the motor in check, to release the motor, and with the connecting means between the driving and driven members, to determine the extent of movement imparted to the driven member, whereby upon operating a given key the motor will be released and the driving member given a full movement and caused to impart to the driven member a movement proportionate to the value of the operated key.

21. The combination of a driving member having a uniform movement at each operation of the machine, a driven member, a latch for intermittently connecting them, a spring motor for moving the driving member, a detent for holding the motor in check, and a series of keys co-operating with the detent to release the motor and with the latch to determine the extent of movement imparted to the driven member, substantially as and for the purpose described.

22. The combination of a driving member having a uniform movement at each operation of the machine, a driven member, a latch for intermittently connecting them, a motor for moving the driving member, means, as a detent, for holding the motor in check, and a series of keys of different values co-operating with the detent to release the motor, and with the latch to disconnect the driving and driven members at different points determined by the operated keys, substantially as described.

23. The combination of an oscillatory driving member having a definite movement at each operation of the machine, a driven member, means, as a latch, for intermittently connecting the driving and driven members, a motor for moving the driving member, means, as a detent, for holding the motor in check, and a series of keys of different values co-operating with the detent to release the motor, and with the latch to determine the extent of movement imparted to the driven member, substantially as described.

24. The combination of an oscillatory driving member making a complete revolution in opposite directions at each operation of the machine, a driven member, a latch for intermittently connecting the driving and driven members, a motor for moving the driving member, a detent for holding the motor in check, and a series of keys of different values co-operating with the detent to release the motor, and with the latch to determine the extent of movement imparted to the driven member, substantially as described.

25. The combination of an oscillatory driving disk having a notch in its periphery and making a complete revolution in opposite directions at each operation of the machine, a driven member, a latch moving with the driven member and co-operating with the notch in the driving disk to intermittently connect said disk and the driven member, a motor for moving the driving disk, a detent for holding the motor in check, and a series of keys of different values co-operating with the detent to release the motor, and with the latch to disconnect the driving and driven members at different points determined by the operated keys, substantially as described.

26. The combination of a train of registering wheels mounted upon a shaft and each provided with two gear wheels, a train of secondary gears mounted upon a parallel shaft, each meshing with one of the gears upon one of the registering wheels and provided with a tooth or projection adapted to intermittently engage one of the gears upon the next higher registering wheel in the train, a rotary shaft, a driving gear splined thereon and movable into engagement with the different secondary gears, a cam for sliding the driving gear along its shaft to successively engage it with the different secondary gears, a motor, and means intermediate the motor and the cam and rotary shaft for rotating the driving pinion and moving it into engagement with the different gears, substantially as described.

In testimony whereof I have signed my name to this specification in the presence of two subscribing witnesses.

CARL W. WEISS.

Witnesses:
A. N. JESBERA,
E. A. GREELEY.